United States Patent [19]
Jette

[11] Patent Number: 6,019,323
[45] Date of Patent: Feb. 1, 2000

[54] FLEXIBLE CABLE MANAGEMENT SYSTEM

[76] Inventor: Roger Jette, 17 Prospect St., Babylon, N.Y. 11702

[21] Appl. No.: 09/015,814

[22] Filed: Jan. 29, 1998

Related U.S. Application Data

[63] Continuation-in-part of application No. 08/637,390, Apr. 25, 1996, Pat. No. 5,839,702.

[51] Int. Cl.⁷ ........................................ F16L 3/00
[52] U.S. Cl. ............................. 248/49; 248/68.1
[58] Field of Search ............... 248/49, 68.1, 80, 248/76, 302, 52, 75; 174/68.1, 68.3

[56] References Cited

U.S. PATENT DOCUMENTS

| | | |
|---|---|---|
| 1,590,910 | 6/1926 | Rumrill . |
| 1,787,106 | 12/1930 | Glazener . |
| 2,082,099 | 6/1937 | Cruser . |
| 2,620,232 | 12/1952 | King . |
| 2,684,512 | 7/1954 | Beman ............................ 248/68.1 X |
| 2,687,329 | 8/1954 | Hunter . |
| 2,891,750 | 6/1959 | Bergquist . |
| 3,021,102 | 2/1962 | Kuempel . |
| 3,053,358 | 9/1962 | Gross . |
| 3,321,571 | 5/1967 | Lynch . |
| 3,363,048 | 1/1968 | Vaughn . |
| 3,588,012 | 6/1971 | Schaefer . |
| 3,687,406 | 8/1972 | Krahe et al. . |
| 4,068,824 | 1/1978 | Flynn . |
| 4,143,845 | 3/1979 | Harris . |
| 4,156,436 | 5/1979 | Hawk ............................. 248/68.1 X |
| 4,337,934 | 7/1982 | Caveney . |
| 4,372,510 | 2/1983 | Skypala . |
| 4,432,519 | 2/1984 | Wright . |
| 4,596,095 | 6/1986 | Chalfant . |
| 4,765,576 | 8/1988 | Peled . |
| 4,840,023 | 6/1989 | Borsani . |
| 5,123,618 | 6/1992 | Guterman et al. . |
| 5,240,209 | 8/1993 | Kutch . |
| 5,323,988 | 6/1994 | Handler . |
| 5,477,649 | 12/1995 | Bessert . |
| 5,524,327 | 6/1996 | Mickel et al. . |
| 5,531,410 | 7/1996 | Simon . |
| 5,548,932 | 8/1996 | Mead . |
| 5,704,571 | 1/1998 | Vargo ................................ 248/68.1 X |

FOREIGN PATENT DOCUMENTS

| | | |
|---|---|---|
| 0298825 | 11/1989 | European Pat. Off. . |
| 553039 | 7/1993 | European Pat. Off. . |
| 556137 | 8/1993 | European Pat. Off. . |
| 571307 | 11/1993 | European Pat. Off. . |
| 2395449 | 1/1979 | France . |
| 1540323 | 2/1970 | Germany . |
| 1615074 | 4/1970 | Germany . |
| 7120422 | 8/1971 | Germany . |
| 2155625 | 5/1973 | Germany . |
| 2358863 | 5/1974 | Germany . |
| 7435122 | 10/1974 | Germany . |
| 3742448 | 6/1989 | Germany . |

OTHER PUBLICATIONS

Copy of International Search Report for PCT/US99/01913.

*Primary Examiner*—Derek J. Berger
*Attorney, Agent, or Firm*—Dilworth & Barrese

[57] ABSTRACT

A cable support assembly which includes at least one elongate flexible spine member and a plurality of open ended support members mounted on the flexible spine member and spaced apart from one another such that the open ended support members define a support surface.

30 Claims, 8 Drawing Sheets

FLEXIBLE CABLE MANAGEMENT SYSTEM

CROSS REFERENCE TO RELATED APPLICATIONS

This application is a continuation-in-part of applicant's co-pending application Ser. No. 08/637,390 filed Apr. 25, 1996, now U.S. Pat. No. 5,839,702, the entire contents of which are hereby incorporated by reference.

BACKGROUND

1. Technical Field

The present disclosure relates to cable management systems and more particularly to flexible cable management systems for cable management and installation applications.

2. Description of Related Art

Currently available cable management systems require the procurement and installation of turning components and transitions. The presently disclosed flexible cable management system is designed to allow for either lateral or vertical curves thus eliminating the need for turning components and transitions.

SUMMARY

The presently disclosed cable management system is designed to allow for the installation, organization, routing and protection of cable. It is designed in such a way as to bend into curves in either lateral or vertical directions without tools, heat, fixtures or chemical alterations and as such is different from any other product. It therefore eliminates the need to procure and to install turning components and transitions. The design of the presently disclosed cable management system with multiple fastener points, allows for single person installation. This will create significant savings in person hours for the design and installation of the invention in user installations.

Equally spaced spoke design and integrated proprietary enter/exit components allow the cable to leave the presently disclosed flexible cable management system at any point and in any direction to reach its destination. The enter/exit components are designed in such a way as to prevent copper or fiber optic cable from kinking or bending in too tight of a radius which would have a negative effect on the performance of the cables signals.

A cable support apparatus is provided, which includes an elongate flexible spine member selectively bendable into a number of different configurations; and a plurality of support members, each of the plurality of support members being attached to the elongate flexible spine member at least at two points along the length thereof, the plurality of support members positioned relative one another to permit substantial bending by hand of the elongate flexible spine member, each of the plurality of support members defining at least one area adapted to receive and support a cable therein.

In a further embodiment, the present disclosure provides a cable support apparatus, which includes an elongate flexible spine member selectively bendable into a number of different configurations; and a plurality of support members attached to the elongate flexible spine member along the length thereof, the plurality of support members positioned relative one another to permit substantial bending by hand of the elongate flexible spine member, each of the plurality of support members defining at least one area adapted to receive and support a cable therein and further having sides defining an opening having an extended portion on one side thereof. The extended portion may extend inwardly toward the opening.

BRIEF DESCRIPTION OF THE DRAWINGS

For a better understanding of the invention, reference is made to the following description of exemplary embodiments thereof, and to the accompanying drawing figures, wherein.

DETAILED DESCRIPTION

Figure 1:
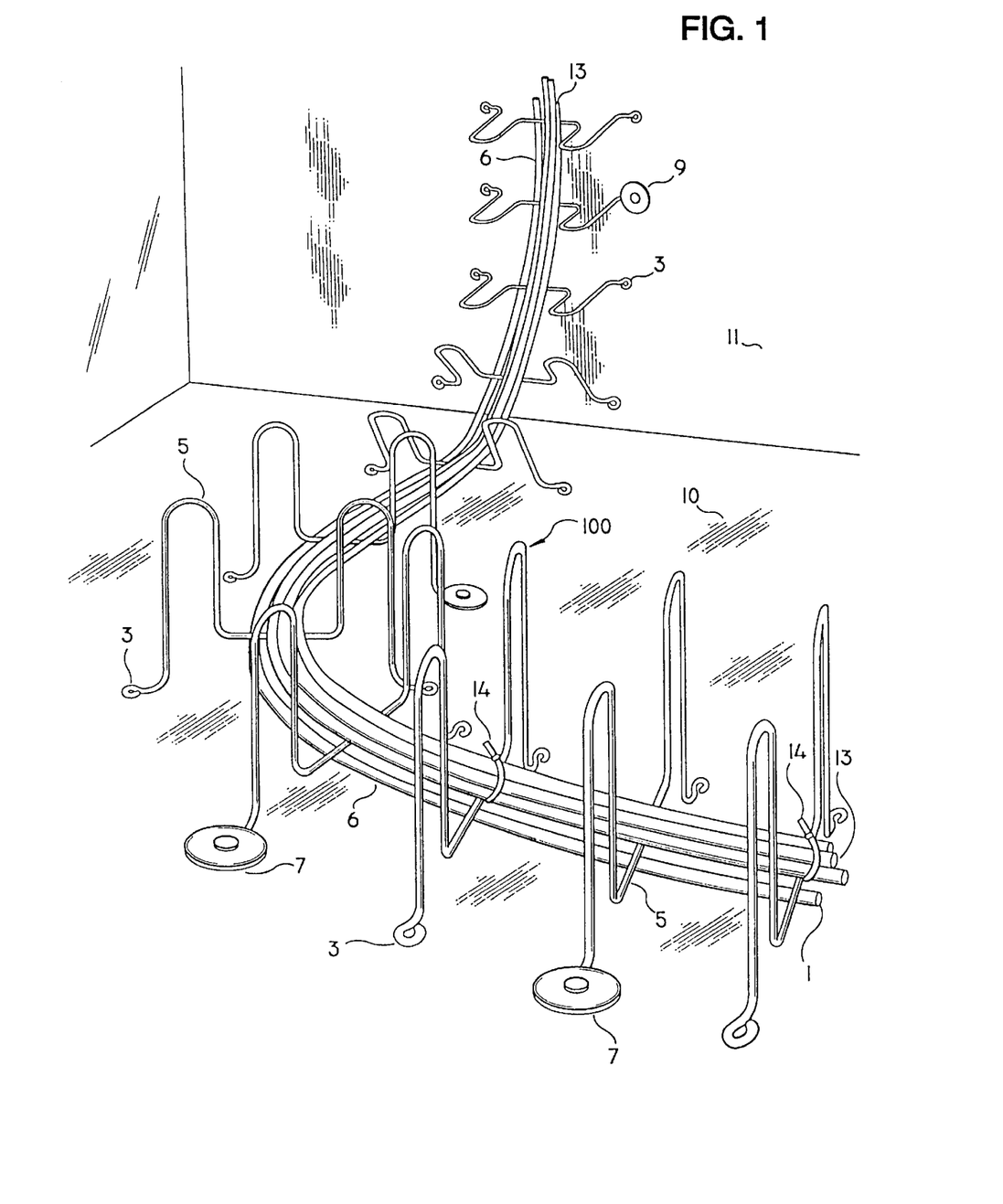
FIG. 1 is a perspective view of the flexible cable management system in accordance with the present invention.

Referring to the drawings in detail, and initially to FIG. 1, the presently disclosed flexible cable management system 100 is shown having both lateral and vertical bends formed therein. Such bends can be formed without the use of tools or other devices. Multiple fastener points 3 allow the flexible cable management system 100 to be secured in whatever position it has been bent, by means of a washered fastener 7 to a concrete surface 10 or a wall board anchor 9 to a wall board surface 11. A plurality of cables 13 are installed within the flexible cable management system and are capable of being secured to any of a plurality of cable support members such as spokes 5 with a standard cable fastener 14. Sections of flexible cable management system 100 can be joined together at a connector tail 1.

Figure 2A:
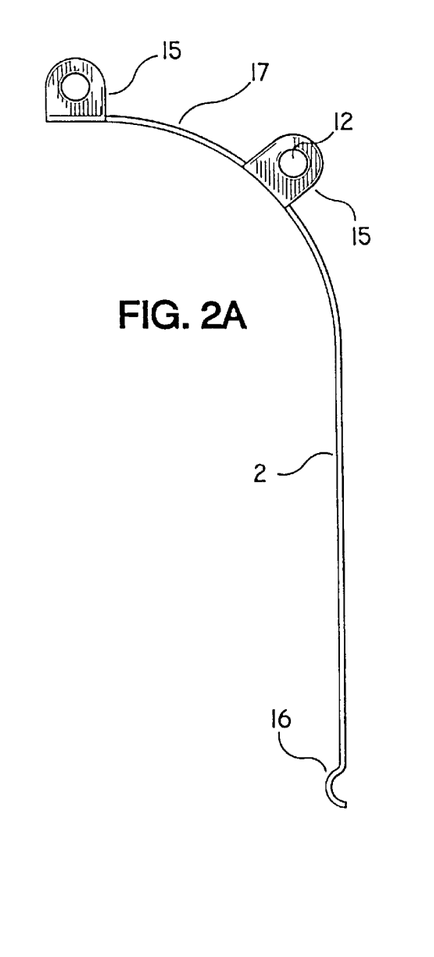
FIG. 2 is an end view of an enter/exit component.
Figure 2B:
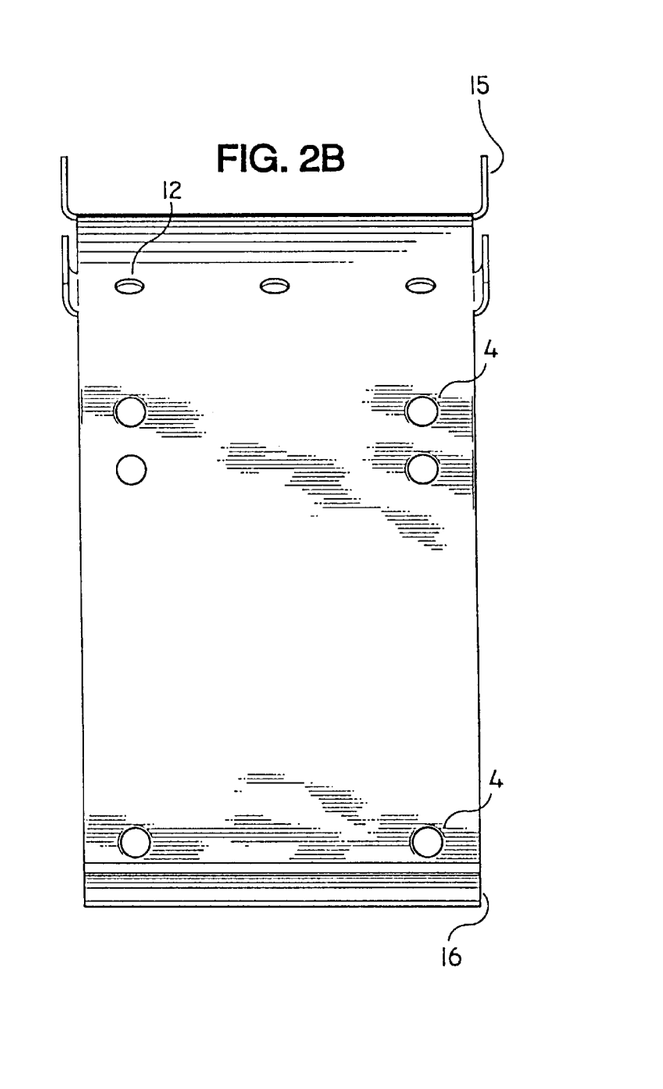
FIG. 2B is a side view of an enter/exit component.
Figure 2C:
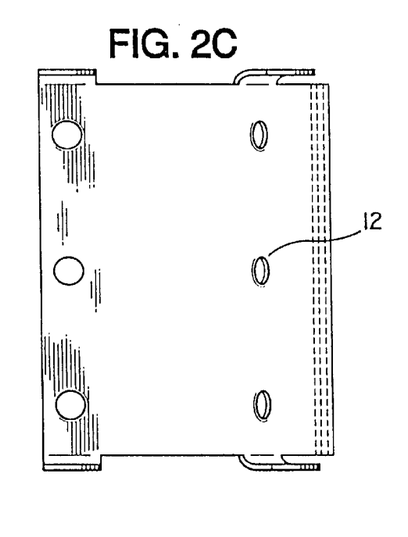
FIG. 2C is a top view of an enter/exit component.

Referring now to FIGS. 2A, 2B and 2C, an enter/exit component 2 is illustrated in the three views. The enter/exit component 2 is indexed to the flexible cable management system 100 by means of a spoke index and secured by wire ties passed through attachment holes 4. A cable may be secured to enter/exit component 2 by means of wire ties passed through wire tie attachment holes 12 and further held in place by means of cable containment tabs 15. A cable radius 17 is formed in enter/exit component 2 to preclude the installed cable from bending too tightly or kinking.

Figure 3A:
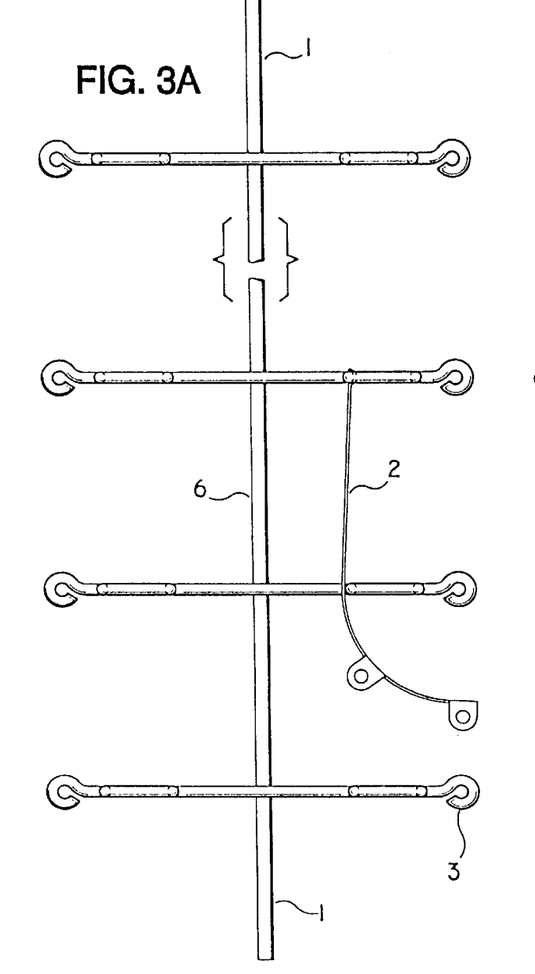
FIG. 3A is a top view of a flexible spine and a plurality of spoke members.
Figure 3B:
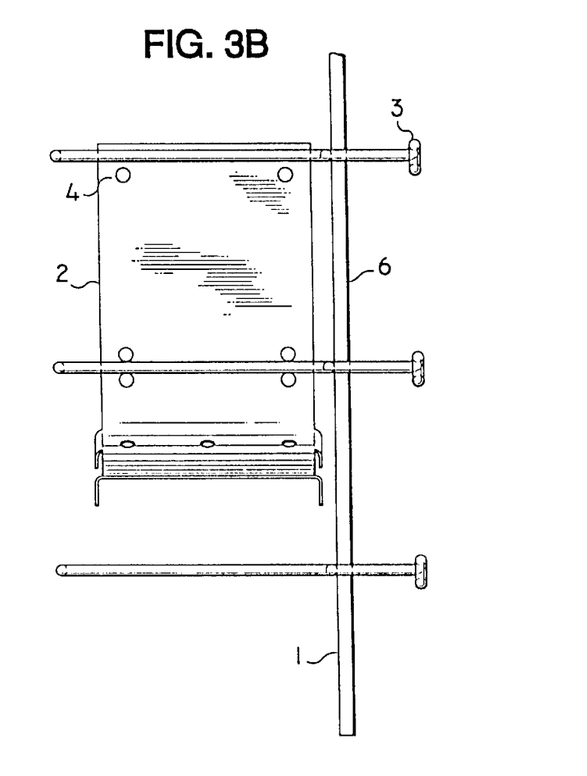
FIG. 3B is a side view of a spoke member.
Figure 3C:
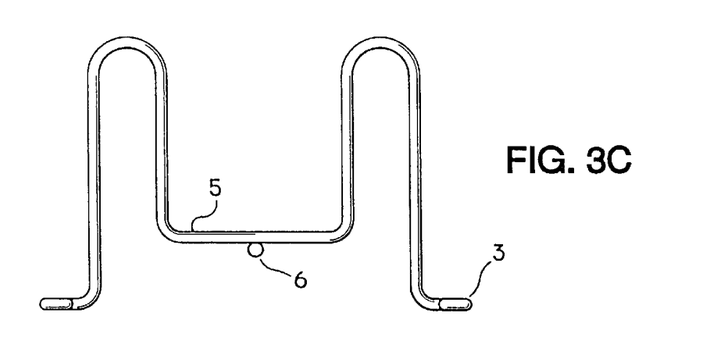
FIG. 3C is a side view of a flexible spine member having spoke members and enter/exit component installed thereon.

In FIGS. 3A, 3B and 3C, a flexible spine 6, spokes 5 and enter/exit component 2 are shown in their assembled positions.

Figure 4A:
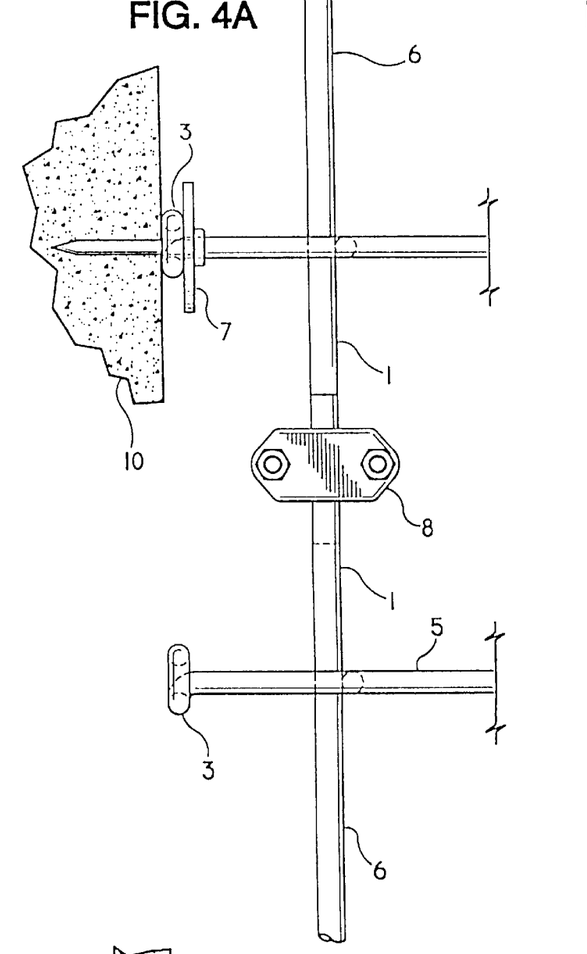
FIG. 4A is a side view of a flexible cable management system fastened to concrete.
Figure 4B:
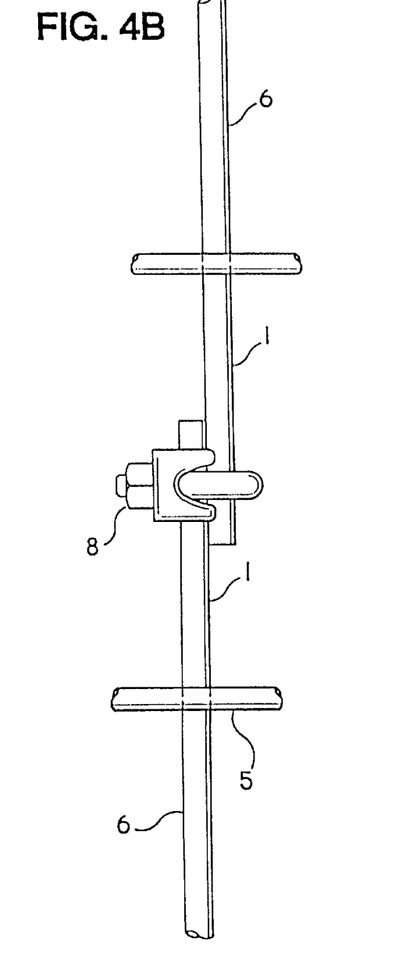
FIG. 4B is a side view of a flexible cable management system fastened to wallboard.
Figure 4C:
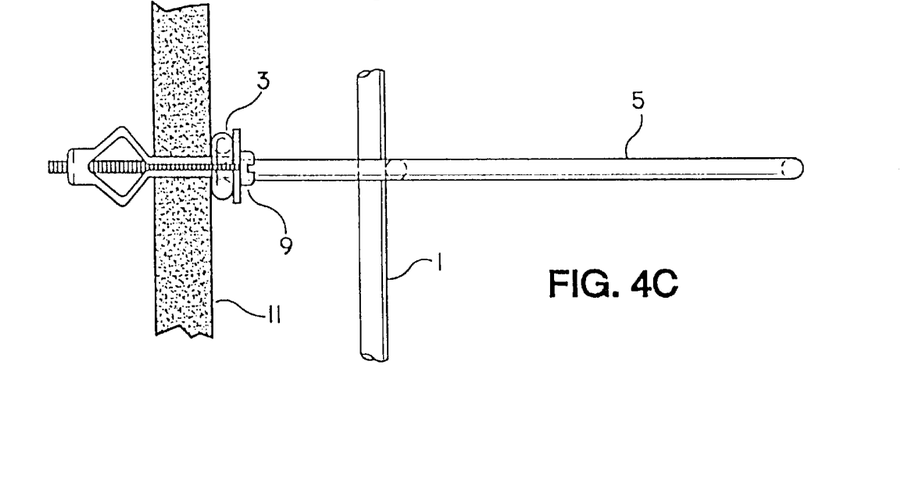
FIG. 4C is a side view of two support sections connected by means of a mechanical clamp.

Referring now to FIGS. 4A, 4B and 4C, various means for attaching the flexible cable management system 100 are illustrated. In FIG. 4A, flexible cable management system 100 is shown anchored to a concrete surface 10 at fastening point 3 by means of washered fastener 7. In FIG. 4B, flexible cable management system 100 is anchored to a wall board 11 at a fastener point 3 by means of a wall board fastener 9. Two support sections are shown joined together at connector tails 1 by means of a standard clamp 8, in FIG. 4C.

The flexible cable management system 100 includes a series of formed wire spokes 5 welded to a single spine 6. The wire spokes 5 are formed in a fashion to allow the maneuvering and protection of the cables 13 that are installed in the system. Having a single spine allows the flexible cable management system 100 to be bent by hand in any direction necessary. Each spoke 5 has two fastener points 3 which allow the flexible cable management system 100 to be secured to the installation surface at multiple points along its length. Preformed proprietary enter/exit components 2 attach to spokes 5 of the flexible cable management system 100 at any point allowing the cable 13 to exit the flexible cable management system 100 without the risk of damage due to kinking. Flexible cable management system 100 is designed in such a way that it can be installed beneath raised floor, on existing floors, on walls and risers or suspended from a ceiling.

During installation, the technician will lay out the path of the cable runs on the primary floor of an installation area between the stantions of the raised floor. The technician would then place eight foot sections of the flexible cable management system 100 on the layout lines, bending by hand where necessary either laterally, up a wall or down a riser. Then, using a standard power charged stud gun and washered fasteners, randomly secure the flexible cable management system 100 to the installation area floor by means of the built in fastener rings. Anti-kink enter/exit components 2 would be installed on spokes 5 of the flexible cable management system 100 where it is necessary for cables 13 to exit the system to reach their destination. After the network of flexible cable management system 100 is completed, the technician would place copper and/or fiber optic cable into flexible cable management system 100 and randomly secure it using cable ties, to spokes 5 of flexible cable management system 100. Flexible cable management system 100 allows cable to be organized, routed and protected against crushing or kinking.

Figures 5, 6:
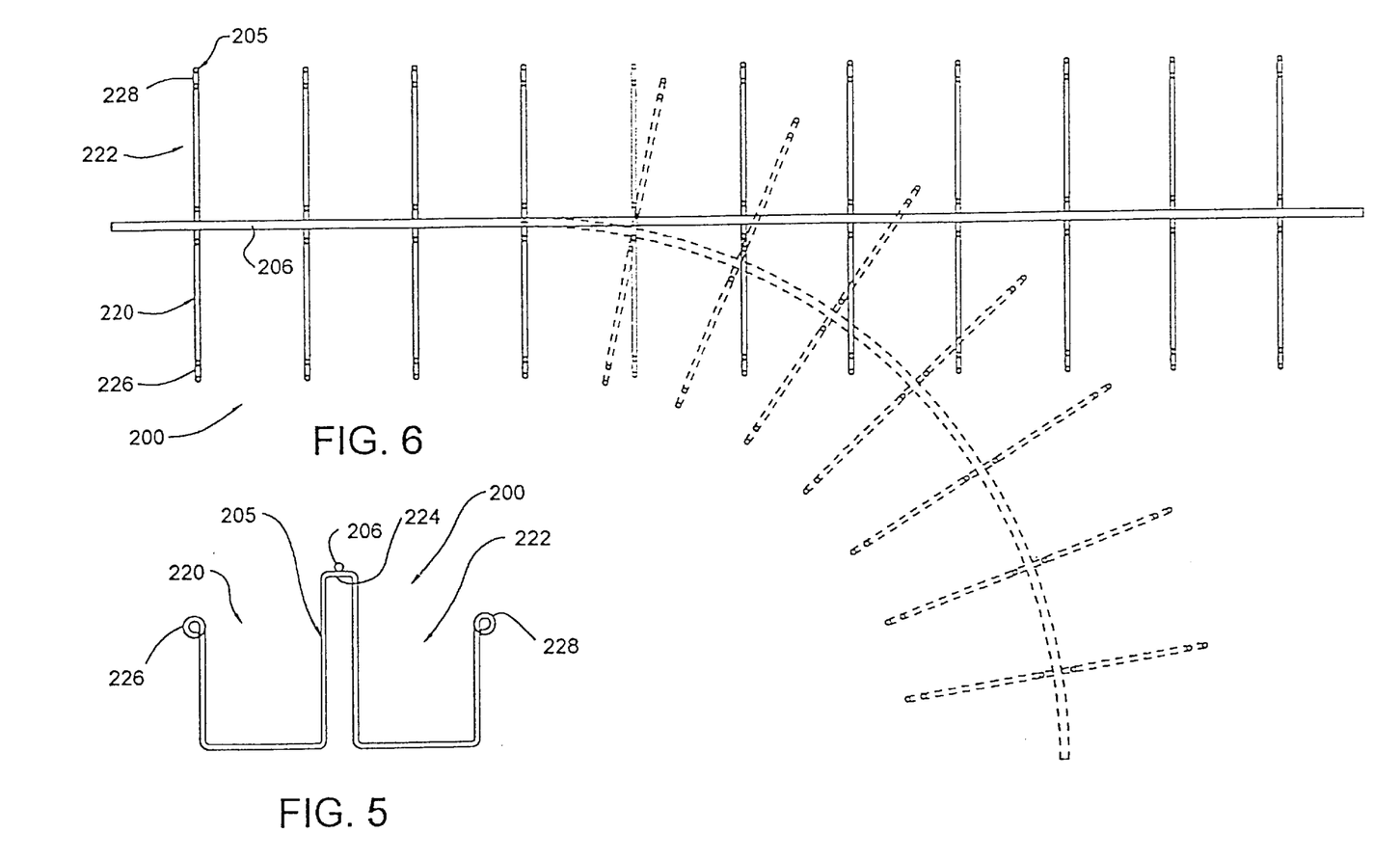
FIG. 5 is an end view of an alternative embodiment of the presently disclosed cable management system.
FIG. 6 is a top view of the embodiment of FIG. 5, which shows the flexibility of the cable management system.

Referring to FIGS. 5 and 6, an alternative embodiment of the cable management system of the present disclosure is shown generally as flexible cable tray 200. Many of the overall characteristics of cable management system 100 are also featured in cable tray 200. Accordingly, the following description will focus mainly on the unique structural and functional aspects of cable tray 200. It is within the scope of the present disclosure, however, that the assembly, connection and fastening features described above in connection with cable management system 100 may apply to cable tray 200 as well.

Cable tray 200 is particularly suited for use in installations wherein it is desirable or even necessary to route cable bundles overhead. The prior practice in some installations of simply laying cable on the top of suspended ceiling grid-work now violates electrical code requirements for many locations. Further, cabling such as fiber optic or copper data transmission cable is subject to signal attenuation due to damage, no matter how slight, which may often be the result of the cable being haphazardly positioned along the top of ceiling grid structure and thus exposed to such damage. Cable tray 200 provides a novel way of suspending cable bundles from the framework of the building structure itself, for example by bracketing the tray to studs or the like.

Similar to cable management system 100, cable tray 200 is preferably constructed of wire stock and includes a flexible spine 206 which runs centrally along the length of cable tray 200. This configuration provides the maximum flexibility for cable tray 200 and, therefore maximum versatility during installation. A dual opening cable support member 205 is formed by bending the wire stock to form cable receiving portions 220 and 222 disposed one on either side of central spine 206. The two receiving portions may be defined by a single piece of wire stock which is bent to form a web section 224. Central spine 206 may be attached to web portion 224 either transversely along the top thereof, as shown in FIG. 5, or the bottom thereof, by any suitable known methods, for example, welding.

The central location of spine 206 facilitates the self balancing feature of cable tray 200. In particular, once cable tray 200 is installed, cable is preferably loaded evenly into each of receiving portions 220 and 222 to effectuate a balanced load in cable tray 200. Looped ends 226 and 228 are provided on cable support 205 to reduce the likelihood of inadvertent damage due to contact of cables with rough edges during installation.

As shown in phantom lines in FIG. 6, cable tray 200 may be flexed significantly to either side, to effectuate at least about a 90 degree or even greater turn of cable tray 200 without individual cable support sections 205 making contact with each other. Similarly, cable tray 200 may transition from a horizontal run to a vertical run.

Figures 7, 8:
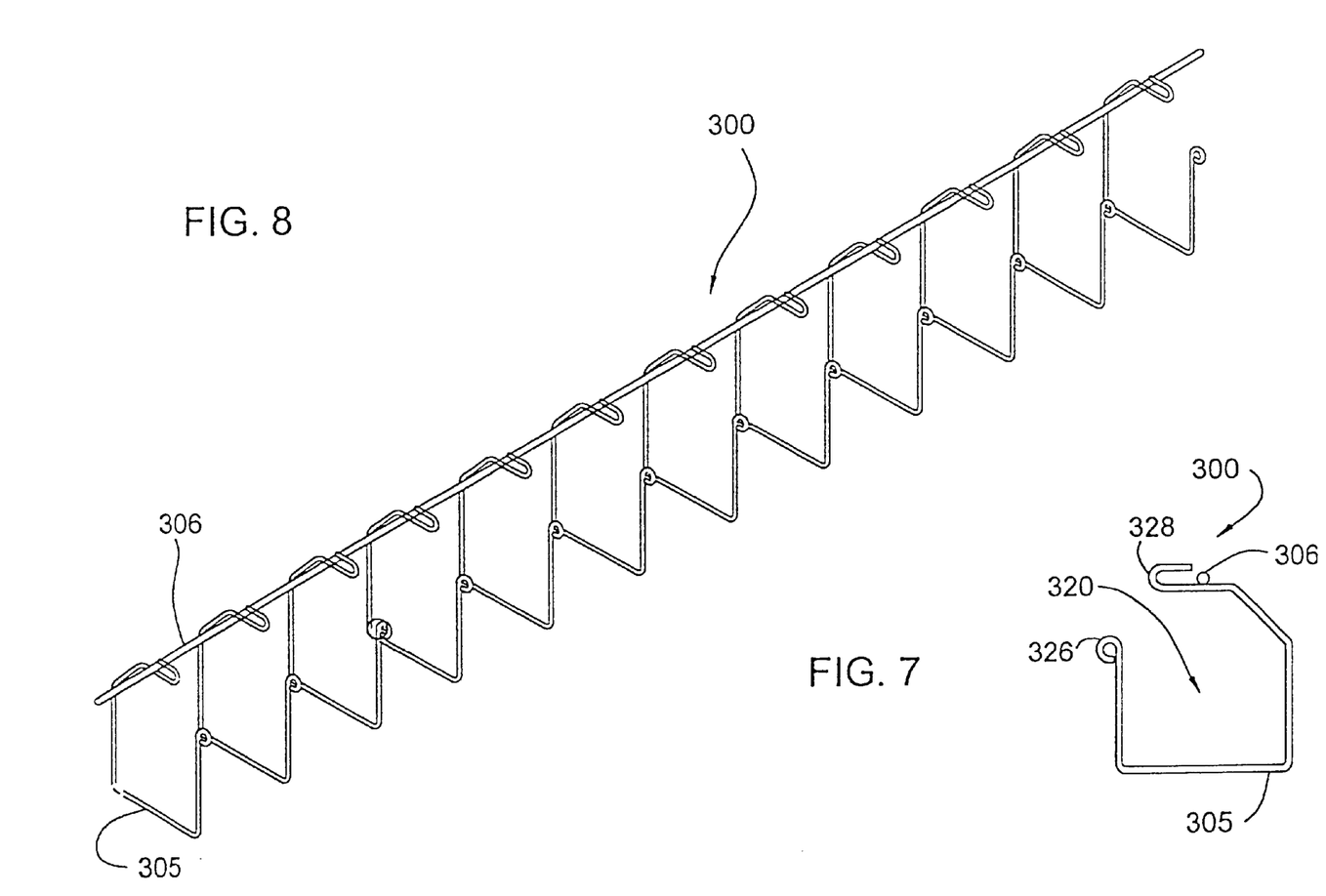
FIG. 7 is an end view of a further alternative embodiment of the presently disclosed cable management system.
FIG. 8 is a perspective view of the cable management system embodiment of FIG. 7.

Referring to FIGS. 7 and 8, a further alternative embodiment constructed in accordance with the present disclosure is shown generally as cable tray 300. Cable tray 300 features partially enclosed cable receiving portion 320. Spine 306 is attached to cable support members 305 transversely along a top segment thereof in similar manner as set forth above for cable tray 200 and cable management system 100. Spine 306 is attached to cable supports 305 substantially directly over the center of gravity of the unit as a whole. In this manner, when cable tray 300 is loaded with cable evenly within receiving portion 320, there will not be any undesirable torque applied to spine 306 which is preferably attached to the building structure by suitable brackets or the like. End portions 326 and 328 are formed to bend away from the opening into receiving portion 320 to minimize the chance of even the slightest amount of damage to the cabling being placed in the receiving portion 320.

Figure 9:
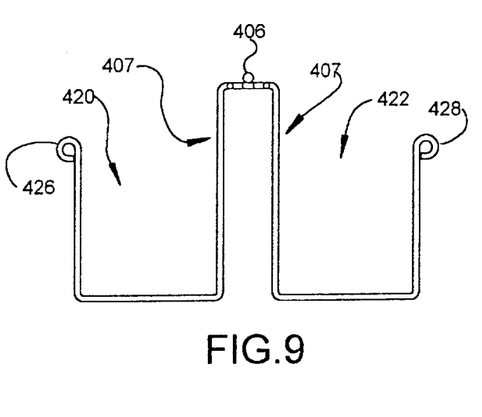
FIG. 9 is an end view of a further alternative embodiment of the presently disclosed cable management system.
Figures 10, 12:
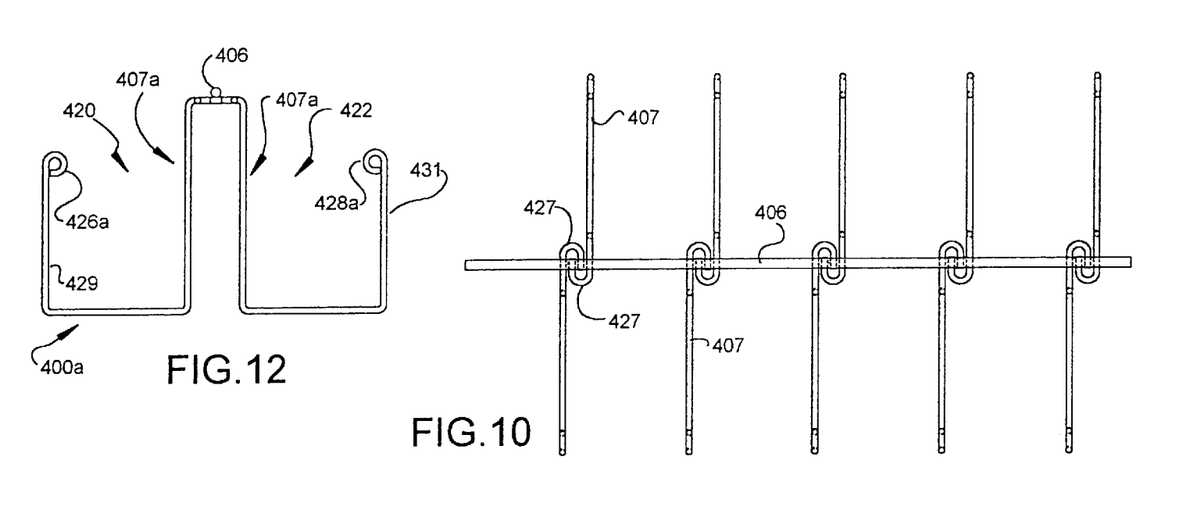
FIG. 10 is a top view of the embodiment of FIG. 9.
FIG. 12 is an end view of an alternative configuration of the embodiment of FIG. 9.
Figure 11:
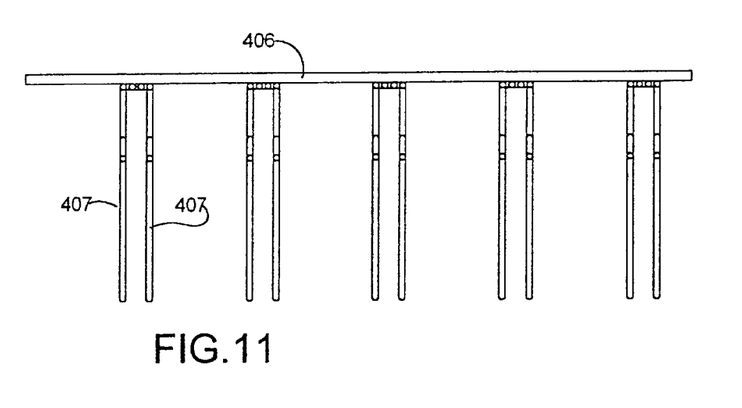
FIG. 11 is a side view of the embodiment of FIG. 9.

Referring to FIGS. 9 through 11, a further alternative embodiment of the cable management system of the present disclosure is shown generally as flexible cable tray 400. Cable tray 400 is similar in many aspects to cable management systems 100 and 200 described above. Accordingly, the following description will focus on the unique structural and functional aspects of cable tray 400. It is within the scope of the present disclosure, however, that the assembly, connection and fastening features described above in connection with cable management system embodiments 100 and 200 may apply to cable tray 400 as well.

Similar to cable management system embodiments 100 and 200, cable tray 400 is preferably constructed of wire stock and includes a flexible spine 406 which runs centrally along the length of cable tray 400. Cable support members 407 are formed by bending the wire stock to form cable receiving portions 420 and 422. Cable support members 407 are attached in pairs, one on either side of central spine 406. As illustrated in FIGS. 9–11, the two receiving portions 420 and 422 are defined by forming two separate lengths of wire stock by bending them into the configuration of the cable receiving and holding areas, e.g., the open ended rectangular areas illustrated in FIG. 9. It is understood, however, that other geometric configurations may also be utilized.

U-shaped horizontal terminal ends 424a and 424b are formed at the upper terminus of the respective inboard vertical leg of receiving portions 420 and 422 of adjacent cable support members 407. Terminal ends 424a and 424b are preferably nested, as best shown in FIG. 10, when cable support sections are attached to spine 406 in a side by side relationship. In this manner, cable tray 400 retains sufficient flexibility so as to be bent by hand for the particular curvature required by the installation. As noted above for previous embodiments, the spine 406 may be attached either transversely along the top of u-shaped terminal ends, as shown in FIG. 9, or the bottom thereof, by any suitable known methods, for example, welding. In this manner, a double attachment point is established for each cable support member 405 with respect to flexible central spine 406, thereby greatly reducing moment forces created in the longitudinal direction of spine 406 at the connection and providing greater stability for each connection.

Alternatively, side by side support members 407 may be formed from a single piece of wire stock bent to form an "s" shaped configuration such that three attachment points are formed between the cable support member and the spine.

Figure 13:
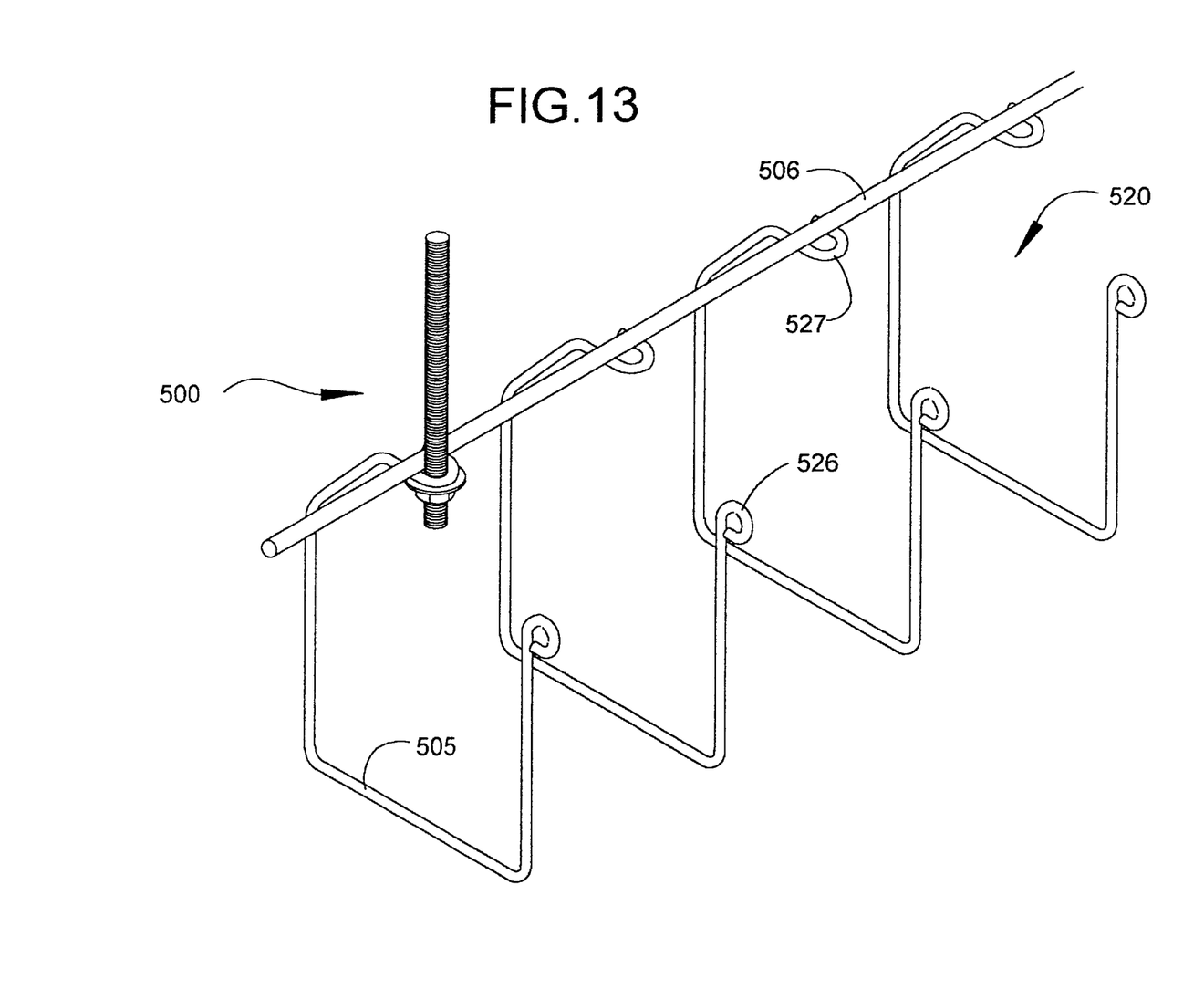
FIG. 13 is a perspective view of a further alternative embodiment of the presently disclosed cable management system.

Terminal ends 424a and 424b are preferably connected such that they form mounting loops 427 which are configured and dimensioned to receive mounting hardware, for example, a threaded bolt and nut combination (see FIG. 13). This eliminates the need for additional separate mounting brackets or the like which would otherwise have to be attached to cable tray 400 in order to mount it to the overhead structure of the building.

As with cable tray 200, the central location of spine 406 facilitates the self balancing feature of cable tray 400. Looped ends 426 and 428 are provided on cable support 405 to reduce the likelihood of inadvertent damage due to contact of cables with rough edges during installation. FIG. 12, however, illustrates an alternative configuration of cable tray 400, designated as cable tray 400a, wherein the looped ends are formed with an inwardly directed bend illustrated by looped ends 426a and 426b. In this configuration, looped ends 426a and 426b are preferably formed such that the gaps formed by looped ends 426a and 426b with vertical portions 429 and 431, respectively, are sufficiently narrow that the individual cables (not shown) coming in contact with looped ends are not damaged. An advantageous feature of this configuration is that cables positioned in cable tray 400a are less likely to be inadvertently moved out of the tray. This is particularly beneficial when cable bundles are being pulled through the tray, especially when being pulled around curved sections where there may be a tendency for the cables to rise near the opening.

Referring to FIG. 13, a further alternative embodiment of the cable management system of the present disclosure is shown generally as flexible cable tray 500. Cable tray 500 is the same in all respects to the embodiment shown and described in FIGS. 7 and 8 for cable tray 300 except that terminal ends 527 are formed as described above for terminal ends 427 of cable tray 400 to provide two attachment points for cable supports 505 to spine 506. Additionally, looped ends 526 formed on the outboard vertical leg of cable supports 505, shown formed outwardly in FIG. 13, may be reversed and formed as described above for the embodiment of cable tray 400 in order to provide the retention feature previously described.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure as defined by the appended claims.

I claim:
1. A cable support apparatus, which comprises:
an elongate flexible spine member selectively bendable into a number of different set configurations; and
a plurality of support members, each of the plurality of support members being attached to the elongate flexible spine member at least at two points along the length thereof, the plurality of support members positioned relative one another to permit substantial bending by hand of the elongate flexible spine member to a selected set configuration, the plurality of support members defining at least one cable pathway adapted to receive and support a cable therein, such that the flexible spine member remains substantially in the selected set configuration upon placement of cables in the at least one cable pathway.

2. The cable support apparatus of claim 1, wherein the plurality of support members are attached to the flexible spine member such that an opening is defined which provides access to the at least one area, the opening being disposed a vertical distance away from the flexible spine member to permit loading or unloading of cables on the cable support apparatus when the cable support apparatus is mounted relative to a base.

3. The cable support apparatus of claim 1, wherein the plurality of support members are attached to the flexible spine member such that the flexible spine member is maintained at a predetermined distance away from the at least one area of each of the plurality of support members.

4. A cable support apparatus, which comprises:
an elongate flexible spine member selectively bendable into a number of different configurations; and
a plurality of support members attached to the elongate flexible spine member along the length thereof, the plurality of support members positioned relative one another to permit substantial bending by hand of the elongate flexible spine member, the plurality of support members defining at least one partially enclosed cable pathway adapted to receive and support a plurality of cables therein, the at least one partially enclosed cable pathway defining an opening adapted to permit installation of cables into the at least one partially enclosed cable pathway, at least one of the plurality of support members having an end portion which extends transverse to the at least one partially enclosed cable pathway.

5. The cable support apparatus of claim 4, wherein the end portion extends inwardly toward the opening.

6. The cable support apparatus of claim 4, wherein the end portion extends outwardly away from the opening.

7. The cable support apparatus according to claim 4 wherein a mounting terminal is formed adjacent a juncture between one of the plurality of support members and the elongate flexible spine member, the mounting terminal configured and dimensioned to cooperate with hardware to facilitate mounting the cable support apparatus to a structure position a vertical distance away from the cable support apparatus.

8. The cable support apparatus of claim 7 wherein the mounting terminal is formed as a loop adapted to receive mounting hardware therein.

9. The cable support apparatus of claim 4 wherein at least some of the plurality of support members define two partially enclosed areas disposed below the flexible spine member and being configured and dimensioned to receive a plurality of cables therein.

10. The cable support apparatus of claim 9 wherein the flexible spine member is positioned along a plane located centrally between the two partially enclosed areas.

11. The cable support apparatus of claim 10 wherein a mounting terminal is formed adjacent a juncture between one of the plurality of support members and the elongate flexible spine member, the mounting terminal configured and dimensioned to cooperate with hardware so as to facilitate mounting the cable support apparatus to a structure.

12. The cable support apparatus of claim 4, wherein the opening is disposed a vertical distance away from the flexible spine member to permit loading or unloading of cables on the cable support apparatus when the cable support apparatus is mounted relative to a base.

13. The cable support of claim 4, wherein the plurality of support members are attached to the flexible spine member such that the flexible spine member is maintained at a predetermined distance away from the at least one area of each of the plurality of support members.

14. A cable support apparatus, which comprises:
an elongate flexible spine member selectively bendable into a number of different set configurations;
a plurality of support members attached to the elongate flexible spine member along the length thereof, the plurality of support members positioned relative one another to permit substantial bending by hand of the elongate flexible spine member to a selected set configuration, the plurality of support members defining at least one partially enclosed cable pathway configured and dimensioned to receive a plurality of cables therein, such that the flexible spine member remains substantially in the selected set configuration upon placement of cables in the at least one partially enclosed cable pathway;
a mounting terminal formed adjacent a juncture between one of the plurality of support members and the elongate flexible spine member, the mounting terminal configured and dimensioned to cooperate with hardware so as to facilitate mounting the cable support apparatus to a structure positioned above the cable support apparatus.

15. The cable support apparatus of claim 14 wherein the mounting terminal is formed as a loop adapted to receive mounting hardware therein.

16. The cable support apparatus of claim 14 wherein at least some of the plurality of support members define two partially enclosed cable pathways disposed below the flexible spine member and being configured and dimensioned to receive a plurality of cables therein.

17. The cable support apparatus of claim 16 wherein the flexible spine member is positioned along a plane located centrally between the two partially enclosed cable pathways.

18. The cable support apparatus of claim 14, wherein the plurality of support members are attached to the flexible spine member such that an opening is defined which provides access to the at least one cable pathway, the opening being disposed a vertical distance away from the flexible spine member to permit loading or unloading of cables on the cable support apparatus when the cable support apparatus is mounted relative to a base.

19. The cable support apparatus of claim 14, wherein the plurality of support members are attached to the flexible spine member such that the flexible spine member is maintained at a predetermined distance away from the at least one cable pathway.

20. A cable support apparatus, which comprises:
an elongate flexible spine member selectively bendable into a number of different set configurations; and
a plurality of support members attached to the elongate flexible spine member along the length thereof, the plurality of support members positioned relative one another to permit substantial bending by hand of the elongate flexible spine member to a selected set configuration, the plurality of support members defining at least one partially enclosed cable pathway disposed at least partially below the flexible spine member and being configured and dimensioned to receive and support a plurality of cables therein, such that cables placed in the cable support apparatus are supported at least partially below the elongate flexible spine member which remains substantially in the selected set configuration.

21. The cable support apparatus of claim 20 wherein the plurality of support members are mounted to the flexible spine member along the length thereof such that the center of gravity of each of the plurality of support members is disposed directly beneath the flexible spine member.

22. The cable support apparatus of claim 20 wherein a mounting terminal is formed adjacent a juncture between one of the plurality of support members and the elongate flexible spine member, the mounting terminal configured and dimensioned to cooperate with hardware so as to facilitate mounting the cable support apparatus to a structure.

23. The cable support apparatus of claim 20 wherein at least some of the plurality of support members define two partially enclosed cable pathways disposed at least partially below the flexible spine member and being configured and dimensioned to receive a plurality of cables therein.

24. The cable support apparatus of claim 23 wherein the flexible spine member is positioned along a plane located centrally between the two partially enclosed cable pathways.

25. The cable support apparatus of claim 23 wherein a mounting terminal is formed adjacent a juncture between one of the plurality of support members and the elongate flexible spine member, the mounting terminal configured and dimensioned to cooperate with hardware so as to facilitate mounting the cable support apparatus to a structure.

26. The cable support apparatus of claim 20, wherein the plurality of support members are attached to the flexible spine member such that an opening is defined which provides access to the at least one cable pathway, the opening being disposed a vertical distance away from the flexible spine member to permit loading or unloading of cables on the cable support apparatus when the cable support apparatus is mounted relative to a base.

27. The cable support apparatus of claim 20 wherein the plurality of support members are attached to the flexible spine member such that the flexible spine member is maintained at a predetermined distance away from the at least one cable pathway of each of the plurality of support members.

28. A method of installing a cable support apparatus comprising the steps of:

providing a cable support apparatus having an elongate flexible spine member selectively bendable into a number of different set configurations; the elongate flexible spine member having a plurality of support members attached at least at two points along the length of the elongate flexible spine member;

bending the elongate flexible spine member to a selected set configuration, the plurality of support members defining at least one cable pathway adapted to receive and support a cable therein, such that the flexible spine member remains substantially in the selected set configuration upon placement of cables in the at least one cable pathway; and securing the cable support apparatus relative to a base.

29. A method of installing a cable support apparatus, comprising the steps of:

providing a cable support apparatus having an elongate flexible spine member selectively bendable into a number of different set configurations, a plurality of support members attached to the elongate flexible spine member the length thereof, the plurality of support members defining at least one partially enclosed cable pathway disposed at least partially below the flexible spine member and being configured and dimensioned to receive and support a plurality of cables therein, such that the elongate flexible spine member which remains substantially in the selected set configuration upon placement of cables in the cable support apparatus;

bending the elongate flexible spine member to a selected set configuration; and securing the cable support apparatus relative to a base.

30. A method of installing a cable support system, which comprises:

providing a series of cable support sections, each cable support section including an elongate flexible spine member and a plurality of support members attached to the elongate flexible spine member along the length thereof to define at least one partially enclosed cable pathway configured and dimensioned to receive a plurality of cables therein;

bending the elongate flexible spine member of at least one cable support section to a set configuration;

connecting the cable support sections to form an elongated cable support pathway; and maintaining the cable support system a distance away from a base by providing leg portions extending from at least some of the cable support sections.

* * * * *